United States Patent [19]

Ideta et al.

[11] 4,294,160
[45] Oct. 13, 1981

[54] OIL PRESSURE BOOSTER

[75] Inventors: Yasufumi Ideta; George Takeda, both of Tokyo; Shoei Watanabe, Koganei, all of Japan

[73] Assignee: Nissan Motor Co., Ltd., Yokohama, Japan

[21] Appl. No.: 120,652

[22] Filed: Feb. 11, 1980

[30] Foreign Application Priority Data

Feb. 14, 1979 [JP] Japan .................................. 54-15015

[51] Int. Cl.³ ............................................. F15B 9/10
[52] U.S. Cl. ........................................ 91/378; 91/422
[58] Field of Search ...................... 91/378, 422, 391 R

[56] References Cited

U.S. PATENT DOCUMENTS

| 3,133,473 | 5/1964 | Garrison et al. | 91/378 |
| 3,633,462 | 1/1972 | Goscenski | 91/391 R |
| 3,677,138 | 7/1972 | Goscenski | 91/378 |
| 3,845,693 | 11/1974 | Meyers | 91/378 |

FOREIGN PATENT DOCUMENTS 1024261 3/1966 United Kingdom .

*Primary Examiner*—Paul E. Maslousky
*Attorney, Agent, or Firm*—Silverman, Cass & Singer, Ltd.

[57] ABSTRACT

The disclosed oil pressure booster includes a spool to be actuated as a brake pedal is depressed, which spool has movable parts of a throttle valve, a return path valve and a control valve, and as the spool is moved in a direction of depressing the brake pedal, the throttle valve is at first closed and then the return path valve is closed, and thereafter the control valve starts to open.

3 Claims, 10 Drawing Figures

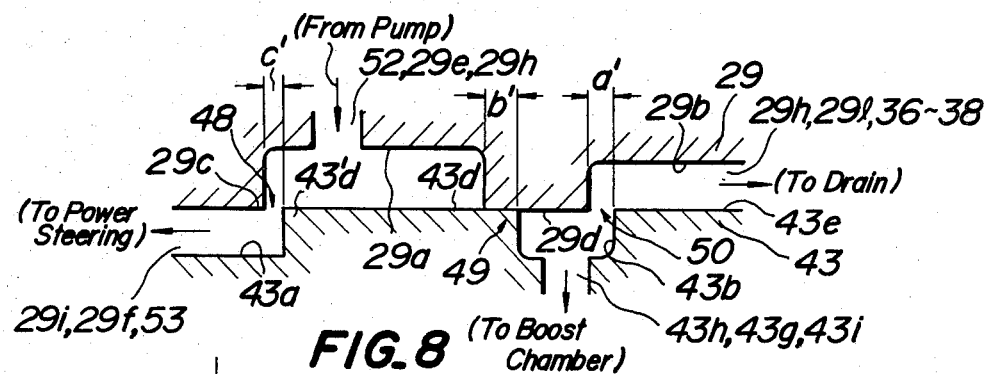
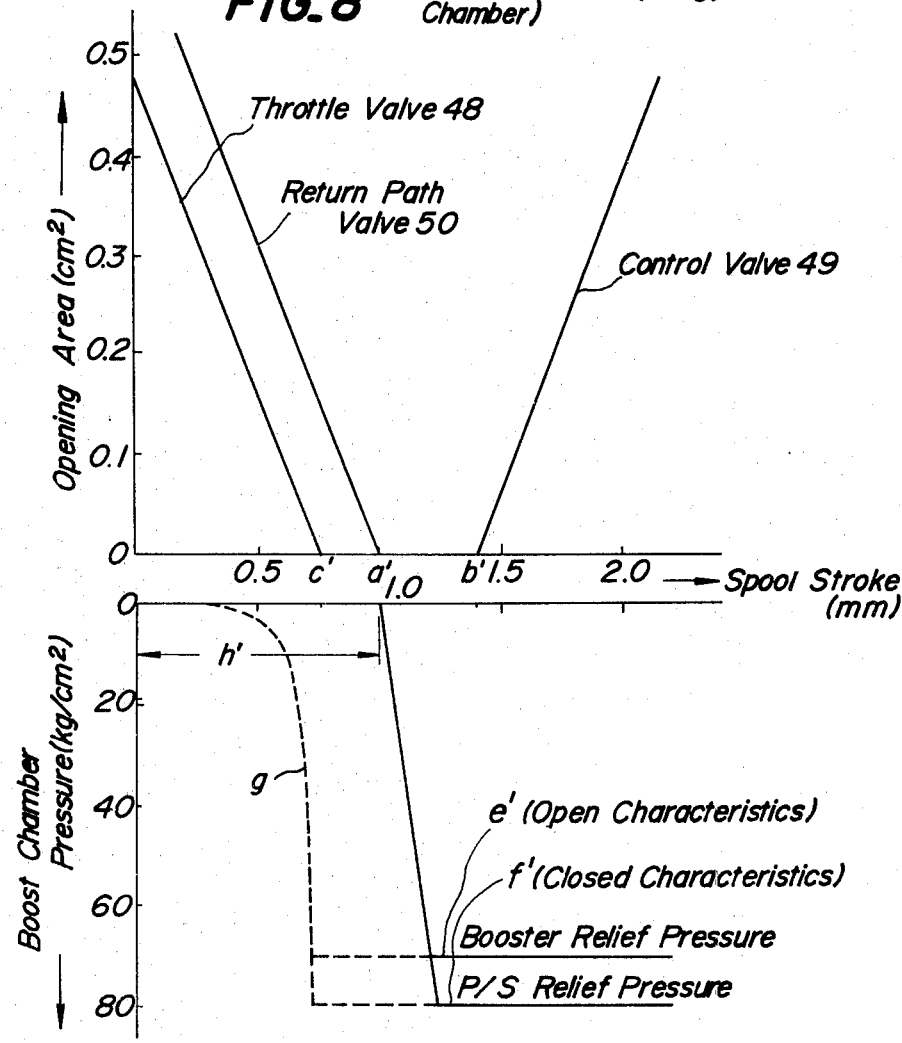

4,294,160

OIL PRESSURE BOOSTER

BACKGROUND OF THE INVENTION

1. Field of the Invention

This invention relates to an oil pressure booster, and more particularly to an improvement of an oil pressure booster which is used in a fork lift, a truck, an automobile, or the like vehicle.

2. Description of the Prior Art

An oil pressure booster of the prior art, which is used for instance in a fork lift, comprises a throttle valve formed of a spool to be driven by a brake pedal, which throttle valve throttles the passage of operating oil flow being delivered upon depression of the brake pedal for generating an oil pressure upstream thereof, a control valve formed of the aforesaid spool, a return path valve formed of said spool and normally communicating a boost chamber to a drain port therethrough, and a power piston operatively related to said spool. The aforesaid oil pressure is applied to the boost chamber through said control valve for moving the power piston in the direction of depressing the brake pedal so as to follow the movement of the spool. The oil pressure booster of the prior art has a shortcoming in that its operating characteristics with an unoperated power steering connected thereto (open characteristics) is widely different from its operating characteristics at the time when the power steering connected thereto is in operation (closed characteristics). Thus, when the power steering is not operated while the oil pressure booster is operated, if the power steering is put into operation for shifting the open characteristics to the closed characteristics, with a certain depressing force applied to the brake pedal (which relates to a boost chamber pressure), the oil pressure delivered to the boost chamber under the closed characteristics is considerably higher than that under the open characteristics, whereby the pressure difference under the two characteristics tends to push up the brake pedal (to be referred to as "oil pressure interference"), which push up cause a discomfort to the driver.

SUMMARY OF THE INVENTION

Therefore, an object of the present invention is to obviate the aforesaid shortcoming of the prior art techniques, by providing an improvement for minimizing the difference between the open characteristics and the closed characteristics, as can be seen from the description of the prior art.

According to the present invention, there is provided an oil pressure booster, comprising a booster body, a spool disposed in the booster body and operatively related to a brake pedal, a power piston to be actuated by said spool, said spool forming a throttle valve for squeezing flow of operating oil being fed upon depression of the brake pedal so as to produce an oil pressure upstream thereof, said spool also forming a control valve for delivering the aforesaid oil pressure to a boost chamber for moving said power piston in the direction of depressing the brake pedal so as to follow said spool, said boost chamber being normally communicated with a drain port through a return path valve formed by said spool, wherein as said spool is moved in the direction of depressing said brake pedal, said throttle valve is at first closed and then said return valve is closed, and thereafter said control valve starts to open.

In an embodiment of the present invention, the throttle valve consists of a corner portion of a land formed on the spool and a shoulder portion of the power piston.

An oil pressure booster of the present invention can be advantageously applied to an oil pressure circuit having an accumulator connected to the booster.

BRIEF DESCRIPTION OF THE DRAWINGS

For a better understanding of the invention, reference is made to the accompanying drawing, in which:

FIG. 7 is a partial sectional view, with a larger scale, of various valves in an oil pressure booster according to the present invention;

FIG. 8 is a graph showing the timing of open and close actions of various valves and booster chamber pressure variation in an oil pressure booster according to the present invention;

DESCRIPITON OF THE PREFERRED EMBODIMENTS

Figure 1:
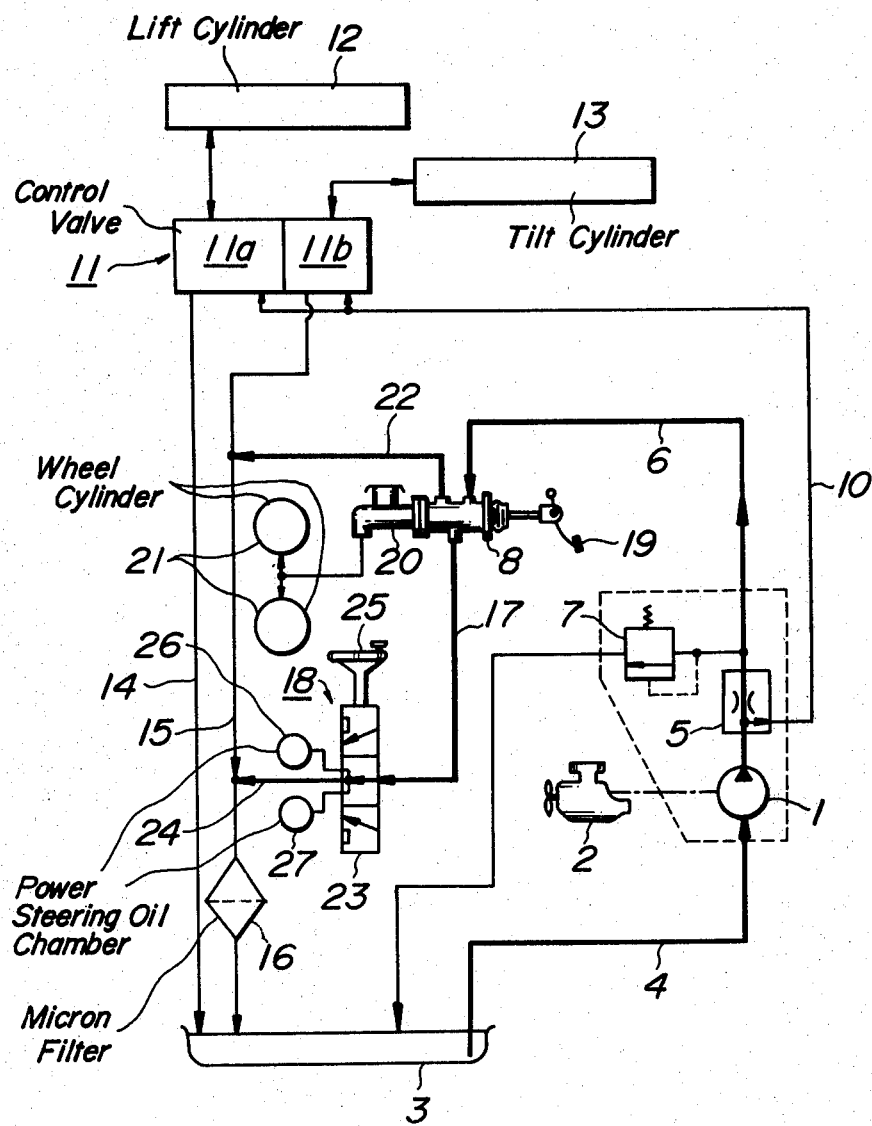
FIG. 1 is a block diagram of an oil pressure control circuit for a fork lift wherein an oil pressure booster is used.

Referring to FIG. 1 showing an example of oil pressure circuits for controlling a fork lift provided with an oil booster, an oil pump 1 is driven by an engine 2 for sucking operating oil from an oil tank 3 through a conduit 4, and the oil pump discharges the operating oil to a flow priority valve 5. The valve 5 acts to deliver a certain amount of the operating oil from the pump 1 toward an oil pressure booster 8 through a conduit 6 while adjusting the oil pressure by a relief valve 7 and at the same time to deliver the remaining operating oil toward a lift control portion 11a and a tilt control portion 11b of a control valve 11 through a conduit 10. The two control portions are used by an operator of the fork lift in controlling a fork thereof during handling a load. More particularly, when the operator operates the control portion 11a so as to communicate the conduit 10 with a lift cylinder 12, the lift cylinder 12 is moved in a direction for raising the fork, and when the operator operates the control portion 11b so as to communicate the conduit 10 with a tilt cylinder 13, the tile cylinder 13 is moved in a direction for raising the tip of the fork and inclining the fork accordingly. For lowering the fork and releasing the inclination of the fork, the control portions 11a and 11b are so operated as to communicate the cylinders 12 and 13 with the drain pipes 14 and 15, respectively. Thereby, the weight of the fork itself and the load being handled cause the cylinders 12 and 13 to move in the reverse directions for effecting the desired actions. A micron filter 16 is provided in the drain pipe 15 for removing foreign particles in the operating oil.

The oil pressure booster 8 throttles the flow of the operating oil from the conduit 6 to an operating valve 23 of a power steering 18 through another conduit 17, for producing an oil pressure by the throttling, which oil pressure is used for magnifying a depressing force at a brake pedal 19 and transmitting the magnified force to a brake master cylinder 20, as will be described in more detail hereinafter. Master cylinder oil pressure from the master cylinder 20 actuates wheel cylinders 21, for braking the fork lift. A drain pipe 22 from the oil pressure booster 8 is joined to the drain pipe 15, and another drain pipe 24 from the power steering operating valve 24 is also connected to the drain pipe 15. As regards the power steering 18, when the operator keeps a steering wheel 25 stationary, the operating valve 23 acts to communicate the conduit 17 and two oil pressure chambers 26 and 27 of the power steering with the drain pipe 24, and upon operation of the steering wheel 25 by the operator, the operating valve 23 acts to communicates one of the oil chambers 26 or 27 to the conduit 17 while communicating the other oil chamber 27 or 26 with the drain pipe 24, respectively. Thereby, the desired power steering is effected.

Figure 2:
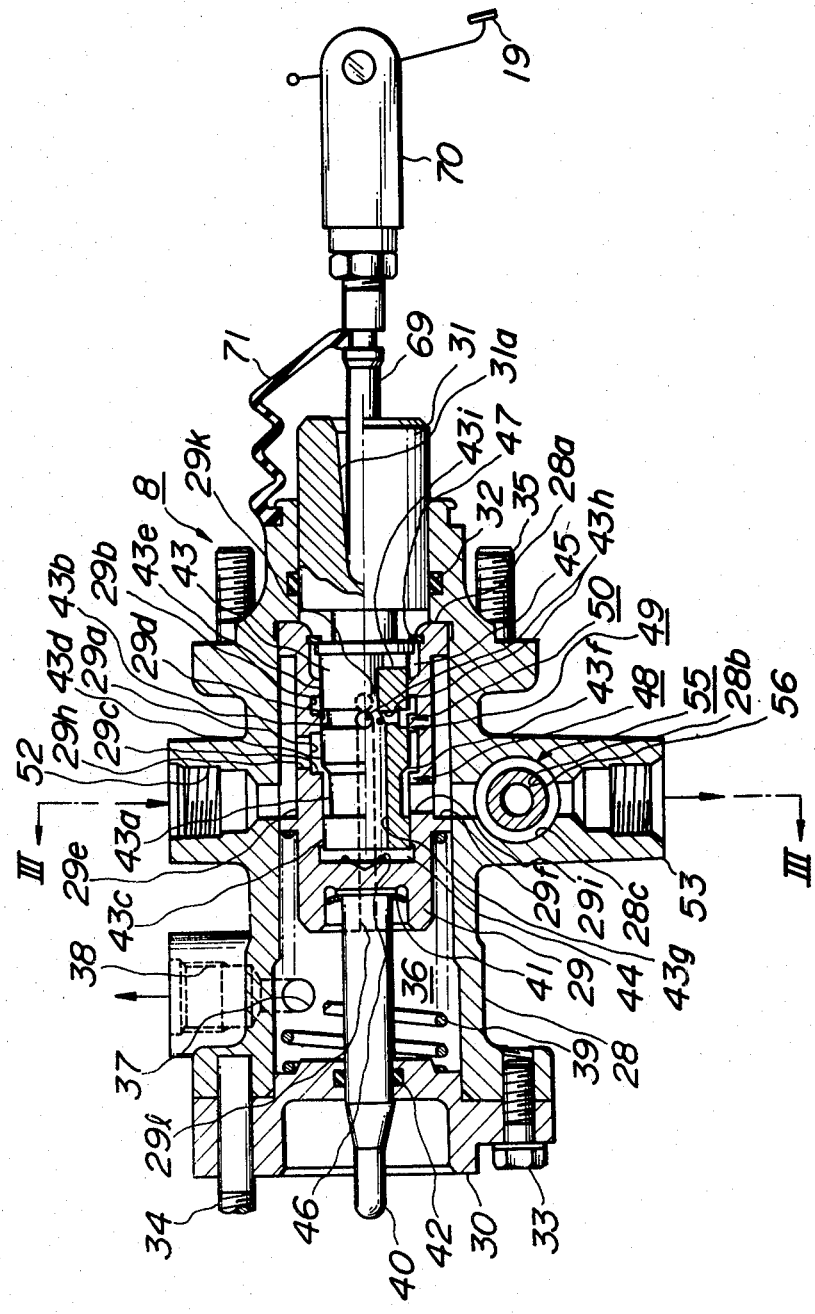
FIG. 2 is a vertical sectional view of a conventional oil pressure booster.

The structure and the function of the oil pressure booster 8 are usually as follows. Referring to FIG. 2 illustrating the structure of a commonly used oil pressure booster 8, a power piston 29 is slidably fitted in the inside of a hollow booster body 28. One end of the booster body 28 is closed by an end cover 30, while the opposite end of the booster body 28 is provided with an operating rod 31 slidably fitted therein with an O ring 32 applied thereto for liquid-tight sealing. The end cover 30 is secured to the booster body 28 by bolts 33, and the end cover 30 and bolts 34 planted to the booster body 28 are so disposed as to allow coaxial mounting of the master cylinder 20 of FIG. 1 onto the booster body 28. The opposite end of the booster body 28 to the end cover 30 is provided with bolts 35 planted thereto, so as to enable the securing of the entire oil pressure booster 8 onto a body of the fork lift.

A chamber 36 is defined between the power piston 29 and the end cover 30, which chamber is communicated with a drain port 38 through a communicating port 37 so as to be used as a drain chamber. A compressed coil spring 39 is disposed between the power piston 29 and the end cover 30, which spring acts as a return spring 39 for the power piston 29 to urge the power piston 29 to the right, as seen in FIG. 2. The rightward movement of the power piston 29 is limited by a shoulder portion 28a of the booster body 28. An output rod 40 is secured to that end of the power piston 29 which faces the end cover 30 in a coaxial manner by a stop ring 41, and the output rod 40 penetrates through the end cover 30 in a liquid-tight manner while engaging an O ring 42 therefor. The extended end of the output rod 40 abuts against a piston of the master cylinder 20 (see FIG. 1). A blind hole is bored from the opposite end of the power piston 29 for fitting a spool 43 therein, and two annular grooves 29a and 29b are formed on the inner surface of the blind hole while defining a shoulder portion 29c and a guide 29d. Two annular grooves 43a and 43b are formed on the outer peripheral surface of the spool 43, while defining three lands 43c, 43d and 43e thereby. The land 43c has an end surface thereof facing a chamber 44, and a tapered surface 43f is formed between the land 43d and the annular groove 43a, and the land 43e extends into a boost chamber 45.

The spool 43 is made hollow, and a spring 46 is fitted in the inside hole 43g of the spool, opposite ends of which spring 46 are seated at the power piston 29 and the spool 43, respectively. Thereby, the spool 43 is urged to the right as seen in FIG. 2, and the righward movement of the spool 43 is limited by engagement of the spool with an end of the operating rod 31, which end of the operating rod 31 engages a snap ring 47 mounted on the power piston 29. The spool 43 has a radial hole 43h extending from the annular groove 43b to the central inside hole 43g and another radial hole 43i extending from the inside hole 43g to the boost chamber 45. The shoulder 29c and the tapered surface 43f form a throttle valve 48 whose function will be described hereinafter, and the guide 29d and the land 43d form a control valve, while the guide 29d and the land 43e form a return path valve 50.

Figure 3:
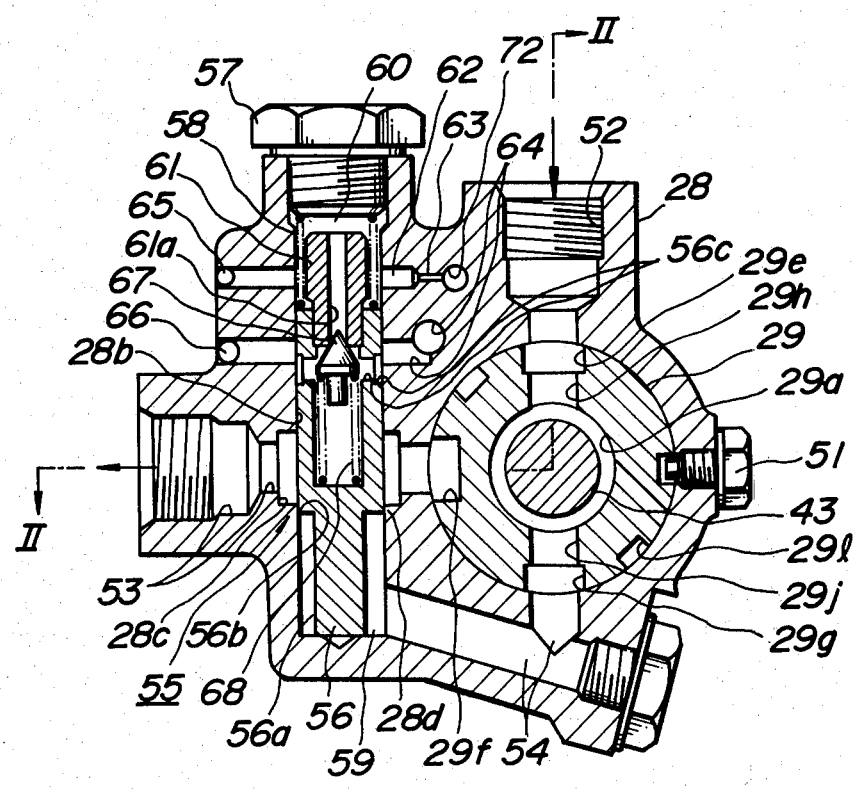
FIG. 3 is a lateral sectional view of the oil pressure booster, taken along the line III-III of FIG. 2.

The power piston 29 also has three longitudinal grooves 29e, 29f, and 29g formed on the outer peripheral surface thereof, as shown in FIG. 3, and the power piston with such construction is prevented from rotating by tip and of a bolt 51 screwed onto the booster body 28. The booster body 28 has an inlet port 52, an outlet port 53, and a communicating port 54, which ports communicate with the longitudinal grooves 29e, 29f, and 29g of the power piston 29 throughout the entire stroke of power piston 29, respectively. The longitudinal groove 29e communicates with the annular groove 29a by a through hole 29h, and the longitudinal groove 29f faces the annular groove 43a by a through hole 29i, and the longitudinal groove 29g communicates with the annular groove 29a by a through hole 29j. The power piston 29 also has a radial hole 29k extending from the annular groove 29b to the outer circumferential surface of the power piston, and this radial hole 29k communicates with the drain chamber 36 through another longitudinal groove 29l formed on the outer circumferential surface of the power piston 29.

A relief valve 55 is provided in the port 53, which relief valve has a main valve 56 slidably fitted in a blind hole 28b bored in the booster body 28 at right angles to the port 53. The main valve 56 is elastically held at one limit position thereof by a spring 58 seated at a plug 57 for blocking the open end of the blind hole 28b. In order to avoid blocking of the port 53 even after inserting the main valve 56 in the blind hole 28b, an annular groove 28c is formed on the inner peripheral surface of the blind hole 28b at right angles to the port 53, which annular groove 28c defines a shoulder 28d at one edge thereof. The diameter of the main valve 56 is reduced at one end 56a thereof located close to the bottom of the blind hole 28b, so as to define a shoulder portion 56b and a main valve chamber 59, which main chamber 59 is communicated with the communicating port 54.

That end surface of the main valve 56 which is on the side of the plug 57 faces a pilot chamber 60, and a valve seat 61 is mounted on that end surface of the main valve. The pilot chamber 60 is communicated with the boost chamber 45 through an oil passage 62 and an orifice 63 formed on the booster body 28, as will be described hereinafter, and the pilot chamber 60 can be also communicated with a drain oil passage 64 through a central hole 61a of the valve seat 61 and an oil passage 56c formed on the main valve 56 so as to communicate with the central hole 61a. At the time of machining the oil passages 62 and 64 on the booster body 28, open ends of such oil passages on the outer peripheral surface of the booster body 28 are sealed off by driving seal balls 65 and 66 therein, respectively. The drain oil passage 64 is formed on the booster body 28 in such a manner that the passage 64 extends to the drain chamber 36 (see FIG. 2) for fulfilling the desired object. To open and close the central hole 61a of the valve seat 61, a pilot valve 67 is disposed in the main valve 56, which pilot valve is held at a closed position thereof by a spring 68 white allowing movement in response to an increase of pressure in the pilot chamber 60.

As shown in FIG. 2, a conical blind hole 31a is formed on the outer end surface of the operating rod 31, and one end of an input rod 69 abuts against the bottom of the conical blind hole 31a, while the opposite end of the input rod 69 is connected to a brake pedal 19 described hereinbefore by referring to FIG. 1 through a clevis 70. In FIG. 2, 71 is a dust boots having one end thereof connected to the booster body 28 and the opposite end thereof connected to the input rod 69, respectively, for the purpose of providing a dust seal of the operating rod 31.

The oil pressure booster 8 with the aforesaid construction is connected to the oil conduit 6 at the inlet port 52, to the oil conduit 17 at the outlet port 52, and to the drain pipe 22 at the drain port 38, respectively as shown in FIG. 1. The operation of the oil pressure booster 8 is as follows.

FIGS. 2 and 3 show the non-operated condition of the oil pressure booster 8. Under such condition, the operating oil delivered from the conduit 6 shown in FIG. 1 into the inlet port 52 flows through the longitudinal groove 29e, the through hole 29h, the annular groove 29a, the throttle valve 48, the through hole 29i, the longitudinal groove 29f, the annular groove 28c in the outlet port 53, and the outlet port 53, and then reach the power steering 18 by way of the oil conduit 17 of FIG. 1. On the other hand, the operating oil delivered to the inlet port 52 is also supplied to the main valve chamber 59 through the longitudinal groove 29e, the through hole 29h, the annular groove 29a, the through hole 29j, the longitudinal hole 29g, and the communicating port 54, but such operating oil is trapped in the main valve chamber 59 because the main valve chamber 59 is interrupted from the annular groove 28c by the shoulder portions 28d and 56b for preventing the operating oil being supplied to the power steering 18 through the outlet port 53. At this moment, the land 43d overlaps the guide 29d for closing the control valve 49 formed thereby and the land 43e is separated from the guide 29c for opening the return path valve 50, so that the boost chamber 45 communicates with the drain circuit of FIG. 1 through the radial hole 43i, the central hole 43g, the radial hole 43h, the annular groove 43b, the annular groove 29b, the radial hole 29k, the longitudinal hole 29l, the drain chamber 36, the drain port 38, and the drain pipe 22.

Figure 4:
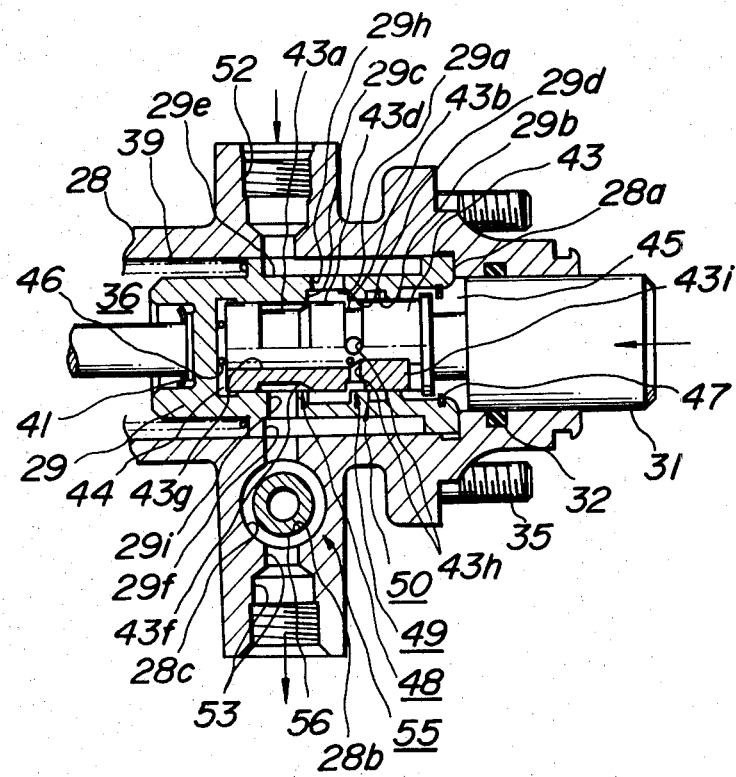
FIG. 4 is an explanatory diagram of the operation of the oil pressure booster of FIG. 2.

Then, upon depression of the brake pedal 19, the spool 43 is pushed through the input rod 69 and the operating rod 31 to the left, as seen in FIG. 2, to the position as clearly shown in FIG. 4. Thereby, the tapered surface 43f approaches to the shoulder portion 29c for reducing the oil passage area of the throttle valve 48 formed of 43f and 29c, so that the flow of the operating oil from the annular groove 29a to the annular groove 43a is reduced. At the same time, the aforesaid leftward movement of the spool 43 acts to close the return path valve 50 and open the control valve 49, so that the oil pressure generated in the annular groove 29a upstream of the throttle valve 48 by said reduction of the oil passage area is applied to the boost chamber 45 through the control valve 49, the annular groove 43b, the radial hole 43h, the central hole 43g, and the radial hole 43a. The oil pressure thus applied to the boost chamber 45 acts on the right-hand end surface of the power piston 29, as seen in FIG. 2 and FIG. 4, so as to move the power piston 29 toward the left until reaching a new balanced position. Due to the repetition of such actions, the power piston 29 is operated by the oil pressure in response to the depression of the brake pedal 19, for actuating the master cylinder 20 through the output rod 40 and braking the fork lift or the like vehicle.

Then, if the brake pedal 19 is depressed by a force stronger than that of a full load point which causes the tapered surface 43f to about against the shoulder portion 29c for completely closing the throttle valve 48 (at this moment, the spool 43 abuts against the bottom of the power piston 29 wherein the spool is fitted, and the fully closed throttle valve eliminates the flow of the operating oil toward the power steering 18 therethrough, as described above), and a maximum oil pressure in the annular groove 29a (to be determined by the relief valve 55, as will be described later) is generated. This oil pressure is similarly applied to the boost chamber 45, for causing strong oil pressure action on the power piston 29, resulting in a sudden braking of the fork lift or the like vehicle.

As shown in FIG. 3, one side of the orifice 63 communicates with the oil passage 62, while the opposite end of the orifice 63 communicates with an oil passage 72 formed on the booster body 28. The oil passage 72 communicates with the boost chamber 45 through a route which is not shown, so as to communicate the pilot chamber 60 with the boost chamber 45 through the oil passage 62, the orifice 63, and the oil passage 72.

With the relief valve of the aforesaid construction, when the oil pressure booster is operated upon depression of the brake pedal 19, the boost chamber 45 continuously communicates with the inlet port 52 and both of them are at the same oil pressure, as can be seen from the foregoing, so that the pilot valve 67 of the relief valve 55 is acted by the same oil pressure as that at the inlet port 52. Accordingly, the relief valve 55 operates as follows: namely, when the oil pressure booster is operated, the oil pressure generated upstream the throttle valve and applied to the boost chamber 45 in the foregoing manner is also applied to the pilot valve 67 from the boost chamber 45 through the oil passage 72, the orifice 63, the oil passage 62, the pilot chamber 60, and the central hole 61a of the valve seat 61. When the oil pressure acting on the pilot valve 67 exceeds a certain value (to be determined by the set load of the spring 68), the pilot valve 67 is opened, and a part of the operating oil is extracted through the aforesaid route and the pilot valve 67 and the oil passage 64. The flow of the operating oil being extracted produces a pressure difference across the orifice 63, and the oil pressure upstream of the orifice 63 is applied to the main valve chamber 59 through the aforesaid route from the inlet port 52 thereto, so that the main valve 56 is raised by the aforesaid pressure difference against the elasticity of the spring 58 and the relief valve 55 completes the supply route of the operating oil from the inlet port 52 to the power steering 18 through the longitudinal groove 29e, the through hole 29h, the annular groove 29a, the through hole 29j, the longitudinal groove 29g, the oil passage 54, the main valve chamber 59, and the outlet port 53. Consequently, even when the oil booster is operated at the full load or more, the power steering can be operated.

On the other hand, when the steering wheel 25 is operated under the condition that the brake pedal 19 is not depressed for keeping the oil pressure booster 8 unoperated, and oil pressure corresponding to the steering load is produced in a route including the inlet port 52, the longitudinal groove 29e, the through hole 29h, the annular groove 29a, the throttle valve 48, the through hole 29i, the longitudinal groove 29f, the annular groove 28c, and the outlet port 53, and the same oil pressure is also applied to the main valve chamber 59 through the annular groove 29a, the through hole 29j, the longitudinal groove 29g, and the communicating port 54. Meanwhile, under such conditions, the control valve 49 is closed and the return path valve 50 is open for communicating the boost chamber 45 with the drain system, so that the pilot chamber 60 communicating with the boost chamber 45 through the oil passage 72, the orifice 63, and the oil passage 62 is connected to the drain system, too. Consequently, when the oil pressure at the main valve chamber 59 corresponding to the steering load surpasses the set load of the spring 58, the main valve 56 is moved against the elasticity of the spring 58 for opening the relief valve 55. Whereby, the operating oil is delivered to the power steering also through the relief valve 55. At this moment, the pilot valve 67 is kept closed, and the aforesaid extraction of the operating oil through the oil passage 64 is not effected, and a large amount of the operating oil is delivered to the power steering through the relief valve 55, so that the response characteristics of the power steering becomes good.

Figure 5:
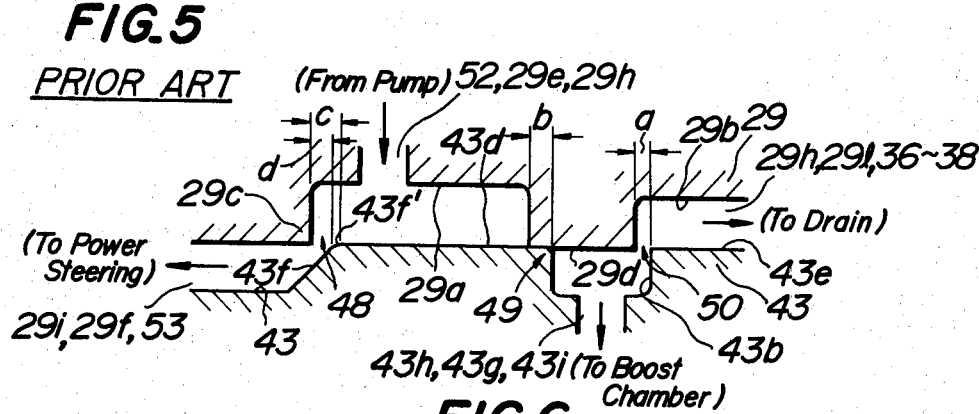
FIG. 5 is a partial sectional view, with a larger scale, of various valves in a conventional oil pressure booster.
Figure 6:
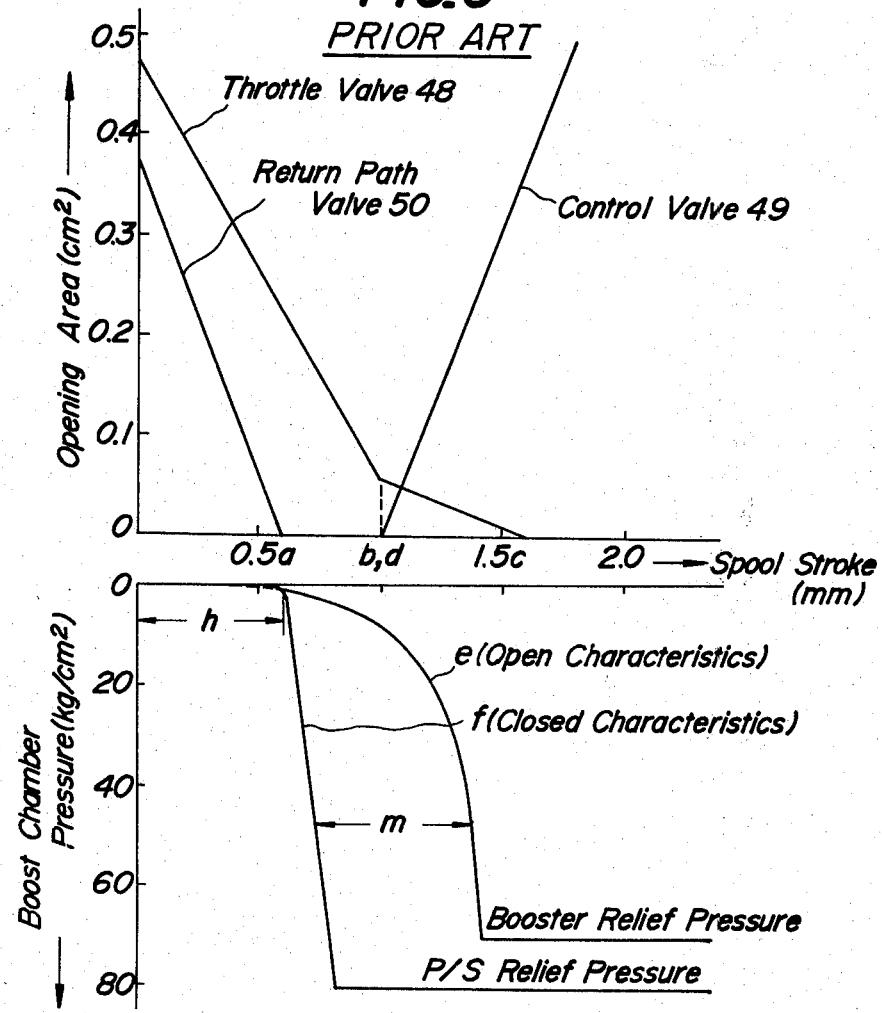
FIG. 6 is a graph showing the timing of open and close actions of various valves of the oil pressure booster of FIG. 5, together with the variation of pressure at the boost chamber.

It is noted here that the close and open timings of the throttle valve 48, the control valve 49, and the return path valve 50 have been set heretofore as shown in FIG. 6, by using a disposition as shown in FIG. 5. More particularly, as shown in FIG. 5, that portion of the tapered surface 43f which is adjacent the land 43d is chamfered so as to form another tapered surface 43f' whose inclination is less than that of the tapered surface 43f, for defining the illustrated distances c and d from the shoulder portion 29c, and the throttle valve 48 is formed of the tapered surfaces 43f and 43f' and the shoulder portion 29c. Under such conditions, it is assumed that the overlapping width between the guide 29c and the land 43d forming the control valve 49 is b, and the spacing between the facing guide 29d and the land 43e forming the return path valve 50 is a. Among the dimensions a, b, and c, a relation of $a < b < c$ is maintained. With such disposition of the throttle valve 48, the control valve 49, and the return path valve 50, if the power piston 29 is fixed and the spool 43 is moved in the direction of depressing the brake pedal, the close and open timings of the valves 48 through 50 and the variations of the oil pressure in the boost chamber 45 (the throttling characteristics of the spool 43) become as shown in FIG. 6.

As can be seen from FIG. 6, as the spool 43 moves in the aforesaid manner, the opening areas of the throttle valve 48 and the return path valve 50 are reduced at first, and when the spool 43 moves by a distance a, the return path valve 50 is closed, and then in response to the movement of the spool 43 by the distances b and d, the control valve 49 starts to open and the throttle valve 48 starts gradual throttling control by the tapered surface 43f, respectively. When the spool 43 moves by a distances c, the throttle valve 48 is closed. During such close and open actions of the valves 48 through 50, as the opening area of the throttle valve 48 is reduced, a pump pressure as shown by the curve e of FIG. 6 is generated upstream the throttle valve 48, and when the power steering is not operated, the aforesaid relief valve 55 acts to cut off the pump pressure in excess of a certain value for providing a booster relief pressure. When the return path valve 50 is closed, such pump pressure is applied to the boost chamber 45 by the aforesaid function of the oil pressure booster, for defining the boost chamber pressure characteristics with power steering unoperated (open characteristics). On the other hand, when the power steering is operated, the operating oil flowing from the oil pressure booster 8 through the oil conduit 17 is stopped at the oil chamber 26 or the oil chamber 27. The pressure upstream the throttle valve 48 is kept at a power steering relief pressure determined by the relief valve 7 (see FIG. 1), and when the oil pressure booster is operated with the return path valve 50 closed, the aforesaid pressure is applied to the boost chamber 45 as the boost chamber pressure characteristics f (closed characteristics) of FIG. 6.

It is noted that, theoretically speaking, the timing of supplying the oil pressure to the boost chamber 45 is the aforesaid manner corresponds to the close and open timing of the control valve 49. In practice, however, even when the control valve 49 is closed, the pressure upstream the throttle valve 48 is supplied to the boost chamber through leakage thereof, and the oil pressure in the boost chamber 45 starts to rise as the return path valve 50 draining the boost chamber 45 is closed, so that the open characteristics and the closed characteristics start to rise as the spool stroke reaches a, as shown by the curves e and f of FIG. 6.

With such open characteristics and the closed characteristics widely different each other, however, while the oil pressure booster is operated with the power steering unoperated, if the power steering is put into operation for shifting the open characteristics e to the closed characteristics f, a certain depressing force on the brake pedal (which relates to the boost chamber pressure) produces a considerably higher oil pressure applied to the boost chamber 45 due to the closed charactersics as compared with that due to the open characteristics, and a large pressure difference (for instance, with a magnitude of m in FIG. 6) therebetween tends to cause the operating rod 31 to push up the brake pedal 19 (to be referred to as "oil pressure interference"), and a discomfort is caused to the driver or the operator.

The present invention obviates the aforesaid oil pressure interference by providing an improved oil pressure booster, and an object of the present invention is to provide an oil pressure booster with a minimized difference between the open characteristics and the closed characteristics thereof, as can be expected from the foregoing explanation.

Thus, in an embodiment of the present invention as illustrated in FIG. 7, the tapered surfaces 43f and 43f' of FIG. 5 are dispensed with, and a throttle valve 48 is formed of a shoulder portion 29c and a corner portion 43d' of a land 43d. Distances a', b', and c' of FIG. 7 are defined in the same manner as the distances a, b, and c shown in FIG. 5, and a relation of $c' < a' < b'$ is maintained.

With the oil pressure booster of the present invention having the throttle valve 48, a control valve 49, and a return path valve 50 thus disposed, when a spool 43 is moved in a direction of depressing a brake pedal while fixing a power piston 29 stationary, the close and open timings of the valves 48 through 50 and the variations of the oil pressure in a boost chamber 45 (throttling characteristics of the spool 43) become as shown in FIG. 8. More particularly, as the spool 43 moves under the aforesaid conditions, the throttle valve 48 and the return path valve 50 reduce the passage areas thereof at first, and when the displacement of the spool 43 amounts to c', the throttle valve 48 is closed, and as the displacement of the spool 43 further increases to a', the return path valve 50 is closed. Thereafter, when The spool 43 further moves to the left until the displacement thereof reaches b', the control valve 49 starts to open.

During such close and open actions of the valves 48 through 50, a pump pressure as shown by a dotted line curve g of FIG. 8 is generated upstream the throttle valve 48 as the opening area of the throttle valve is reduced. This pump pressure is cut off by the aforesaid relief valve 55 as the pump pressure surpasses a certain value for defining a booster relief pressure provided that the power steering is not operated, which pressure is applied to the boost chamber 45 from the moment when the return path valve 50 is closed in response to the displacement a' of the spool 43, so that the booster relief pressure of the open characteristics e' is materialized. On the other hand, when the power steering is operated, the oil pressure upstream the throttle valve 48 is maintained at a power steering relief pressure which is determined by the aforesaid relief valve 7 (see FIG. 1), and such power steering relief pressure is delivered to the boost chamber 45 from the moment when the return path valve 50 is closed as the spool 43 moves by the distance a', so that the power steering relief pressure of the closed characteristics f' can be materialized.

Therefore, with the oil pressure booster with the valves thus disposed, as can be seen from a comparison of the open characteristics e' and the closed characteristics f' of FIG. 8, there is no pressure difference between the boost chamber pressures in response to a certain depressing force on the brake pedal for the power steering operated and for the power steering unoperated, so that even if the operation of the power steering is started while the oil pressure booster is operated, the operating rod 31 does not push up the brake pedal 19 and the discomfort caused by the oil pressure interference on the operator or the driver is eliminated.

It is noted here that, since the oil pressure booster of the present invention has the close and open timings of the valves 48 through 50 as described above, the initial storke h' determined by the closing timing of the return path valve 50 becomes larger than that of the conventional oil pressure booster (as shown by h in FIG. 6), but it is possible to shorten the initial stroke h' by forming the throttle valve 48 by using the corner portion 43d' of the land 43d as in the case of the illustrated embodiment with reduced dimensions c', b' and a'.

Another example having the oil pressure booster of the present invention applied to an oil pressure circuit similar to that of FIG. 1 but provided with an accumulator will be explained now by referring to FIG. 9.

Figure 9:
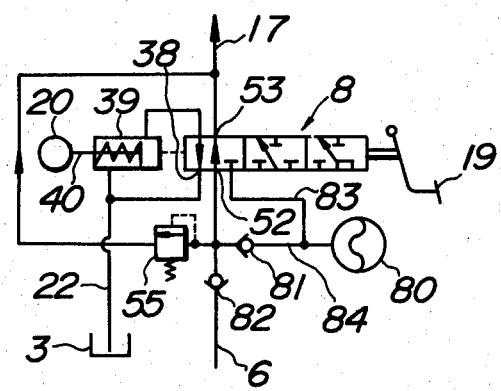
FIG. 9 is a schematic diagram of an oil pressure circuit with an oil pressure booster of the present invention and an accumulator connected to the booster.

In FIG. 9, a check valve 82 is provided on an oil conduit 6 communicating a flow priority valve with an oil pressure booster 8, and an accumulator 80 is connected to the downstream of the check valve through an oil conduit 84. Another check valve 81 is provided at an intermediate portion of the oil conduit 84, and the downstream of this check valve is connected to an oil pressure booster 8 through another oil conduit 83. The oil pressure circuit of FIG. 9 is otherwise similarly constructed as that of FIG. 1.

With the accumulator added in the aforesaid manner, even when the oil pump fails to operate, several times of the boosting operation by the oil pressure booster 8 are possible by using the oil pressure stored in the accumulator 80. In this case, with a conventional oil pressure booster, a pump pressure generated in response to a normal light depressing force on the brake pedal is not so high, and the oil pressure stored in the accumulator 80 is low and any large magnified force cannot be achieved. If an oil pressure booster according to the present invention is used, even with a light depressing force on the brake pedal, the pump pressure is increased to the booster relief pressure, so that a high oil pressure can be stored in the accumulator 80 and a large magnified force can be achieved.

Figure 10:
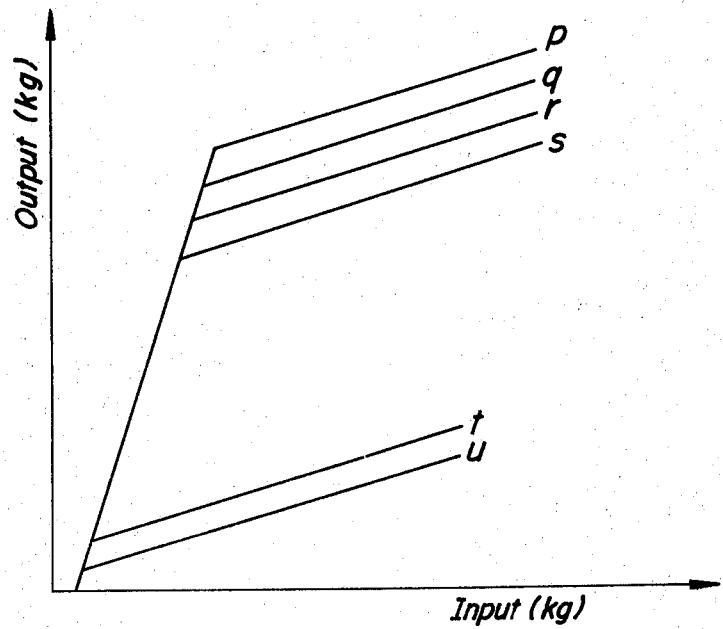
FIG. 10 is a graph showing force-magnifying characteristics of both a conventional oil pressure booster and an oil pressure booster of the present invention, in case of an oil pump failure in an oil pressure circuit provided with an accumulator.

FIG. 10 shows an example of force-magnifying characteristics (with an ordinate representing the input to the input rod and an abscissa representing the output from the output rod). If the force-magnifying characteristics in the case of a sound oil pump is assumed to be represented by a line p in FIG. 10, force-magnifying characteristics with a conventional oil pressure booster in the case of a failure of the oil pump are low, as shown by a line t for a first brake operation and a line u for a second brake operation, while with the oil pressure booster according to the present invention, a high force-magnifying characteristics or ratio can be achieved as shown by a line q for a first brake operation, a line r for a second brake operation, and a line s for a third brake operation, which high force-magnifying characteristics is desirable for safety.

As described in the foregoing, according to the present invention, a throttle valve, a return path valve, and a control valve are formed by using a spool operatively related to a brake pedal in such a manner that, in response to depression of the brake pedal, the throttle valve is at first closed, and then the return path valve is closed, and thereafter the control valve is opened, so that identical spool strokes can be achieved for a given depressing force of the brake pedal for both open characteristics and closed characteristics, whereby the push up of the brake pedal can be prevented. If the oil pressure booster of the present invention is applied t an oil circuit provided with an accumulator, a high oil pressure can be stored in the accumulator even for a regular light depressing force of the brake bedal.

What is claimed is:

1. An oil pressure booster comprising a booster body with an inlet port, an outlet port, and a drain port; a power piston fitted in said booster body; a spool fitted in said power piston and operatively connected to a brake pedal; a throttle valve, a return path valve and a control valve defined between said power piston and said spool so as to close and open in response to movement of said spool; and a boost chamber defined in said booster body and normally communicating with said drain port through said return path valve; said throttle valve throttling flow of operating oil supplied from said inlet port in response to depression of the brake pedal so as to generate an oil pressure upstream of said throttle valve, said control valve selectively allowing passage of said oil pressure to said boost chamber for causing said power piston to follow the movement of said spool in a depressing direction of the brake pedal, wherein in response to movement of said spool in said depressing direction of the brake pedal, said throttle valve is closed at first and then said return path valve is closed and thereafter said control valve starts to open.

2. An oil pressure booster as set forth in claim 1, wherein said power piston has a shoulder formed on a surface thereof facing said spool, and said spool has a land with a corner formed on a surface thereof facing said power piston, and said throttle valve is formed of said shoulder portion and said corner of said land.

3. An oil pressure booster as set forth in claim 1, wherein said power piston has a shoulder portion and a guide portion formed on a surface thereof facing said spool, and said spool has a first land with two corners and a second land formed on a surface thereof facing said power piston in such a manner that, said throttle valve is formed of said shoulder portion and one corner of said first land, and said control valve is formed of said guide portion and the remaining corner of said first land, and said return path valve is formed of said guide portion and said second land.

* * * * *